Figure 1:
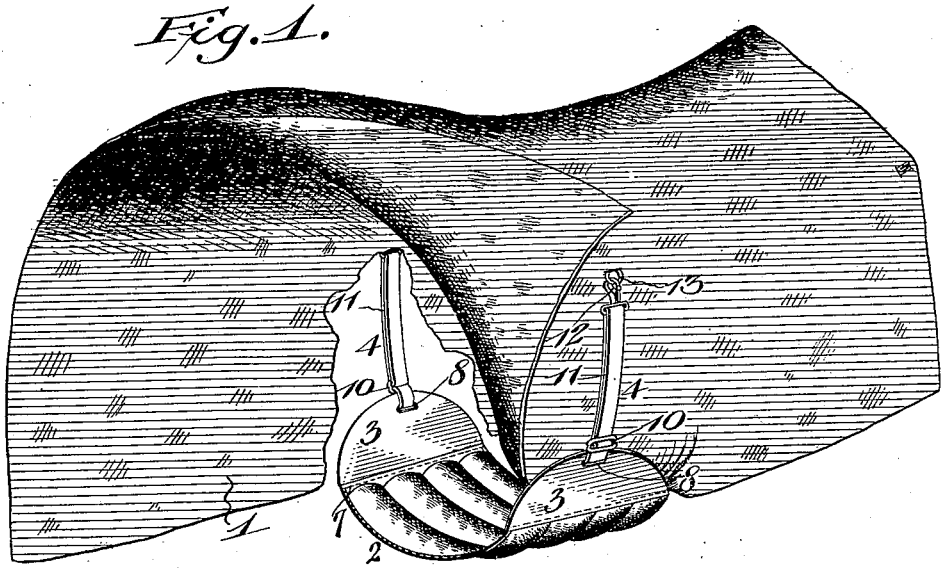

No. 645,368. Patented Mar. 13, 1900.
F. H. MITCHELL.
ANIMAL BLANKET RETAINING MEANS.
(Application filed June 29, 1898.)
(No Model.)

Witnesses
Fletcher H. Mitchell, Inventor.
By his Attorneys,

UNITED STATES PATENT OFFICE.

FLETCHER H. MITCHELL, OF CERRILLOS, TERRITORY OF NEW MEXICO.

ANIMAL-BLANKET-RETAINING MEANS.

SPECIFICATION forming part of Letters Patent No. 645,368, dated March 13, 1900.

Application filed June 29, 1898. Serial No. 684,709. (No model.)

*To all whom it may concern:*

Be it known that I, FLETCHER H. MITCHELL, a citizen of the United States, residing at Cerrillos, in the county of Santa Fé and Territory of New Mexico, have invented a new and useful Blanket-Holder for Animals, of which the following is a specification.

This invention relates to horse-blankets, and particularly to the means for retaining blankets or articles of a like character in proper position upon a horse or other animal.

The object of the present invention is to provide novel and reliable means applicable to any form of blanket, fly-net, &c., whereby such blanket or other article may be securely fastened or retained and properly positioned upon an animal without any possibility of the blanket becoming accidentally displaced.

Hitherto it has been a very difficult matter, if not an impossible one, under varying conditions, to secure a blanket or analogous article upon an animal so that it could not become displaced. When a blanket does become displaced, it is liable to fall from the animal and to be trampled upon and torn to pieces, so as to be rendered useless. Not one blanket in a hundred is actually worn out, blankets being in a great majority of cases ruined by the animal trampling upon and tearing the same. Besides this, a blanket when displaced from the animal is liable to be carried to a distance by the wind, where it may be either lost or stolen.

The object of the present invention is to overcome this difficulty and to provide means whereby a blanket when properly adjusted upon an animal will be held thereon absolutely and without failure.

The essential feature of the invention consists of a weight with attaching means, whereby it may be applied to the opposite pendent sides of the blanket when in position on the animal. This weight may be of almost any form and construction and composed of any heavy substance. For example, it may be in the nature of a bag, sack, or receptacle filled with sand, shot, or other loose material, or it may be made in solid form and composed of lead, iron, or other metal. The weight or weighted receptacle is attached to the side portions of the blanket and is designed to hold the blanket in place by gravity alone, the weight hanging close to, but preferably not in actual contact with, the animal. By this arrangement the weight is compactly arranged under the animal and is so governed in its movements that it cannot shift either to one side or the other.

The device is adapted to be applied to a blanket or net of any description, size, or shape, the character of the blanket or net and the particular means for attaching the weight not being essential to the broad idea of the invention.

The detailed features of construction and the preferred form and arrangement of the parts will be fully set forth in the accompanying description, taken in connection with the drawings forming a part of this specification, and all novel features of the invention will be fully pointed out in the claims hereto appended.

Figure 2:
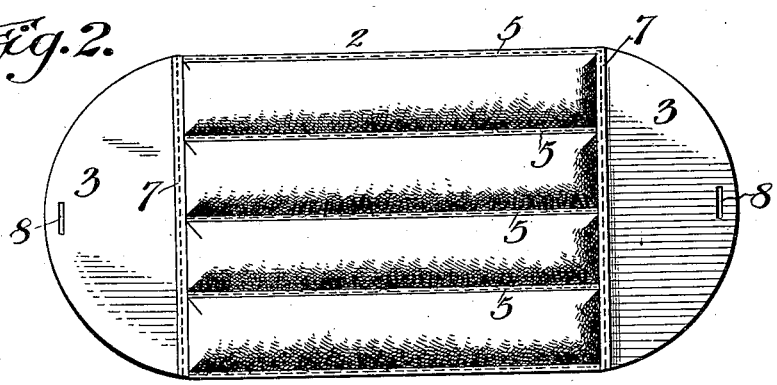
Figure 3:
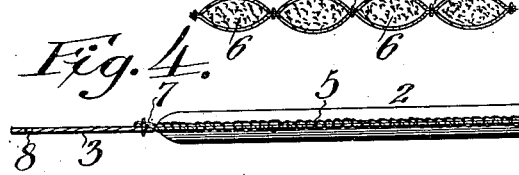
Figure 4:
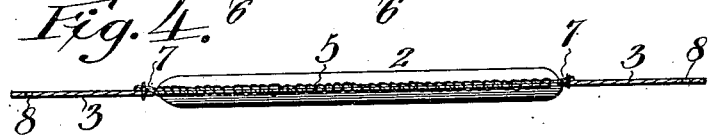

In the accompanying drawings, Figure 1 is a perspective view illustrating a blanket and showing the blanket-retaining device or weight attached thereto in its proper relative position. Fig. 2 is a plan view of the retaining device or weight. Fig. 3 is a cross-section through the same. Fig. 4 is a longitudinal section through the same.

Similar numerals of reference designate corresponding parts in all the figures of the drawings.

The blanket (indicated at 1) may be of any usual or preferred form, the retaining device contemplated in this invention being designed to be applied to any style of blanket or fly-net or analogous covering constructed in accordance with the desire of the manufacturer or user, the said device being applicable to blankets or fly-nets already in use.

The retaining device is essentially a weight, the same being indicated at 2. Under the preferred embodiment of this invention the weight is constructed in the form of a sack composed of two or more thicknesses or plies of canvas, leather, or other analogous flexible material, as shown in the drawings. Said plies or thicknesses are stitched or otherwise secured together along their marginal edges, as shown at 5 and 7, and it is also preferred to stitch the plies or thicknesses together and in contact with each other along parallel lines, as shown at 5, thereby dividing the sack or receptacle into compartments, which are subsequently partially or wholly filled with some heavy material, such as sand or shot, for giving the necessary weight to the device. The parallel compartments into which the sack or receptacle is divided may extend either longitudinally of the device, as shown in Figs. 1 and 2, or transversely thereof, according to the desire of the manufacturer and in order to impart to the device as a whole the requisite flexibility to enable it to accommodate itself to the contour of the animal.

In order to provide for securing the device to the blanket, the weighted sack or receptacle is provided with attaching portions or flaps 3, preferably of leather or some stout, durable, and flexible material, said attaching portions being stitched or otherwise secured to the marginal portions of the sack, as shown at 7. These attaching portions may be either of segmental or other form and are provided with openings 8 near their outer ends for the reception of straps 4, which are looped, as shown at 11, and provided with buckles 10, whereby they may be lengthened or shortened. The straps 4 pass through the loops of a pair of snap-hooks 12 or other suitable fasteners adapted to be detachably connected with eyes 13, secured to the blanket or net at suitable points on the side or pendent portions of the blanket.

The filling may, as previously stated, consist of sand, shot, or any other heavy loose material suitable to be placed in the parallel pockets or compartments 14.

After the blanket or net has been placed upon the back of the animal the snap-hooks at the ends of the straps are engaged with the rings or eyes on the blanket, and by means of the buckles with which each strap is equipped the straps may be lengthened or shortened, so as to bring the weight to the proper elevation and into the desired relation to the animal. When in place, the weight places a constant and even tension on each side of the blanket, and as the weight is loosely suspended beneath the animal and does not come in contact with the animal there is no liability of the weight shifting from side to side, thus causing annoyance.

From the foregoing description it will be seen that the essential feature of the invention resides in a weight so attached to the pendent side portions of a blanket as to impose an equal weight or tension thereon and prevent either side of the blanket from moving upward at one side rather than the other side. Should one side of the blanket be carried partially upward for any reason, as where the animal rubs against a tree or other object, the side portions of the blanket will assume their normal positions as soon as the animal moves away from such object, said result being obtained solely by the operation and influence of the weight upon the blanket. It will thus be seen that the blanket is held in place by gravity alone, and it will also be appreciated that no particular fastening or attaching device for the blanket is essential. The weight is compactly arranged and not distributed througout an extended area. The blanket is held in proper place at all times and perfectly straight upon the animal, and it will be observed that this is accomplished by means of a weight which hangs in one place beneath the animal and between the two side portions of the blanket. The device is absolutely reliable when the blanket and weight have been properly adjusted to the animal and all danger or liability of the accidental displacement of the blanket is overcome.

I do not desire to be limited to any of the details of construction hereinabove set forth, but expressly reserve the right to change, modify, and vary the construction within the scope of this invention, all of which may be done without departing from the principle or sacrificing any of the advantages thereof.

Having thus described my invention, what I claim as new, and desire to secure by Letters Patent, is—

1. A retaining device for horse-blankets, &c., consisting of a weight having attaching means whereby it may be secured to the side portions of a blanket or like article, so as to lie beneath and out of contact with an animal, substantially as described.

2. A retaining device for horse-blankets, &c., consisting of a weight having attaching means, whereby it may be secured to a blanket or like article, so as to lie under and out of contact with an animal, and adjustable connections adapted to be interposed between the weight and blanket.

3. A horse-blanket or net retaining device, consisting of a weight in the form of a sack constructed to provide a compartment in which a heavy filling material is placed, said weighted sack or receptacle having attaching portions, whereby it may be secured to the blanket, substantially as described.

4. A horse-blanket or net retaining device, consisting of a weight in the form of a flexible sack or receptacle comprising a plurality of compartments, each having an independent filling of heavy, loose material, said sack or receptacle being provided with attaching portions for the reception of the suspending connections, substantially as described.

In testimony that I claim the foregoing as my own I have hereto affixed my signature in the presence of two witnesses.

FLETCHER H. MITCHELL.

Witnesses:
B. M. DONALDSON,
JAMES S. BARTON.